US010178225B1

United States Patent
Solid et al.

(10) Patent No.: US 10,178,225 B1
(45) Date of Patent: Jan. 8, 2019

(54) CONTRABAND WIRELESS COMMUNICATIONS DEVICE IDENTIFICATION IN CONTROLLED-ENVIRONMENT FACILITIES

(71) Applicant: Securus Technologies, Inc., Carrollton, TX (US)

(72) Inventors: Kelly S. Solid, Palm Bay, FL (US); Mark Baker, Palm Bay, FL (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/854,536

(22) Filed: Dec. 26, 2017

Related U.S. Application Data

(63) Continuation of application No. 14/848,752, filed on Sep. 9, 2015, now Pat. No. 9,854,087.

(51) Int. Cl.
| | |
|---|---|
| *H04M 1/66* | (2006.01) |
| *H04M 3/22* | (2006.01) |
| *H04W 4/02* | (2018.01) |
| *H04W 12/08* | (2009.01) |
| *H04W 8/18* | (2009.01) |
| *H04L 12/26* | (2006.01) |
| *H04M 15/00* | (2006.01) |

(52) U.S. Cl.
CPC .......... *H04M 3/2281* (2013.01); *H04L 43/04* (2013.01); *H04M 3/2218* (2013.01); *H04M 15/61* (2013.01); *H04W 4/02* (2013.01); *H04W 8/18* (2013.01); *H04W 12/08* (2013.01)

(58) Field of Classification Search
CPC ......... H04W 4/02; H04W 4/021; H04W 4/12; H04W 4/14; H04W 4/26; H04W 12/00; H04W 12/06; H04W 12/08; H04W 12/10; H04W 12/12
USPC ....... 455/405, 410, 422.1, 456.1, 456.5, 466
See application file for complete search history.

(56) References Cited

U.S. PATENT DOCUMENTS

| | | |
|---|---|---|
| 2010/0105416 A1 | 4/2010 | Nadler et al. |
| 2010/0279627 A1 | 11/2010 | Bradley |
| 2013/0023247 A1 | 1/2013 | Bolon et al. |
| 2014/0080445 A1 | 3/2014 | Noonan et al. |
| 2014/0164178 A1 | 7/2014 | Adjaoute |
| 2014/0194084 A1 | 7/2014 | Noonan et al. |
| 2014/0253322 A1 | 9/2014 | Chapin et al. |
| 2014/0254777 A1 | 9/2014 | Olligschlaeger et al. |
| 2014/0270126 A1 | 9/2014 | Torgersrud et al. |
| 2015/0207927 A1 | 7/2015 | Torgersrud et al. |
| 2016/0007201 A1 | 1/2016 | Torgersrud et al. |
| 2016/0191484 A1 | 6/2016 | Gongaware |

*Primary Examiner* — Temica M Beamer
(74) *Attorney, Agent, or Firm* — Fogarty LLP

(57) ABSTRACT

Systems and methods for identification of a controlled-environment facility resident in possession of a contraband communications device capture or otherwise accept managed access data and/or contraband communications device assessment data for contraband communications devices operating in the controlled-environment facility. Controlled-environment facility resident call data for each resident of the controlled-environment facility is gathered from the controlled-environment facility resident communications system. Correlations in the managed access data and/or assessment data with the controlled-environment facility resident communications system call data are analyzed to identify each resident of the controlled-environment facility in possession of a contraband communications device.

21 Claims, 6 Drawing Sheets

CONTRABAND WIRELESS COMMUNICATIONS DEVICE IDENTIFICATION IN CONTROLLED-ENVIRONMENT FACILITIES

CROSS-REFERENCE TO RELATED APPLICATION

This is a continuation of, and claims benefit of, U.S. patent application Ser. No. 14/848,752, also entitled Contraband Wireless Communications Device Identification in Controlled-Environment Facilities, filed Sep. 9, 2015 and issued as U.S. Pat. No. 9,854,087 on Dec. 26, 2017 and, which is hereby incorporated herein by reference.

TECHNICAL FIELD

The present disclosure relates generally to controlled-environment facilities, more specifically to communications by residents of controlled-environment facilities, and particularly to identification of the possessor(s) of (a) contraband wireless communications device(s) in controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communications available to controlled-environment residents include the ability to exchange email and canned text messages between residents and non-residents of the controlled-environment facility. Basically, all of these forms of communication aim to facilitate communication between a resident of a controlled-environment facility and a non-resident.

However, residents of controlled-environment facilities are typically restricted from unauthorized communications with individuals outside of the controlled-environment facility. For example, in correctional facilities inmates are typically prohibited from unauthorized communications with individuals outside of the correctional facility. Thus, in many controlled-environment facilities, unauthorized cell phones, smartphones, tablet computing devices, and other mobile communications devices that circumvent facility communication systems may be considered contraband. Further, in most correctional institutions, or the like possession of a contraband communications device is considered a violation of facility rules and/or regulations, and therefor may be punishable. Often, once located, the contraband communications device is confiscated.

The use of contraband communications devices within controlled-environment facilities, such as correctional institutions, poses a risk to facility security, an avenue for continued criminal activity for correctional system inmates, and additionally a loss in revenues for facility operators and administration. Controlled-environment facility residents may obtain access to contraband devices through many different sources. Family and friends are a potential source. Similarly, facility staff (e.g. corrections officers) may be a potential source of contraband devices. For example, inmates, or associates of inmates, may pay a member of prison staff, such as a corrections officer or civilian worker, to smuggle a contraband communications device, such as a cell phone, into a correctional institution.

Residents may use the contraband communications device to circumvent facility communication systems, which are often monitored. During the course of communications, inmates may make incriminating admissions, commit further criminal acts, conspire to commit further criminal acts, or leave a trail of incriminating data. Ordinarily, these actions and admissions may be monitored by facility communication systems and investigators. By circumventing the facility communication system, however, it may not be possible to monitor such activities. For example, a correctional facility inmate may use a contraband cell phone to contact gang affiliates in an attempt to direct further criminal activity from within the facility. In another correctional environment example, an inmate may use a contraband smartphone or tablet device to access illegal images, including images of child pornography. In a general controlled-environment facility example, a resident may use the contraband communications device to contact friends and family in an effort to avoid payment of communications fees. Additionally, facilities typically make use of revenues derived from a resident's use of facility communication systems to operate, update, and maintain the facility communications system. When a resident circumvents the facility communication systems, financial revenue is lost, which could otherwise benefit the facility and other inmates and administration thereof. Many other illegal or illicit acts may be perpetrated by the use of contraband communications devices.

Authorities operating the controlled-environment facility often try to identify and avoid unauthorized use of contraband communications equipment. There are some previously known methods for detecting and/or controlling access to contraband communications equipment including jamming of frequencies used for cell phone communications, managed access systems, and use of mobile detection equipment (e.g. "wands"), but each of these methods has substantial drawbacks. For example, jamming of communication frequencies is typically illegal in the United States. Managed access systems may allow access to corrections officers and/or staff, but limit access to unauthorized users within the facility, but such systems typically require significant investment in system installation and configuration. Mobile detection equipment may be circumvented by the inmates by simply turning the power off on the device. Also, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates, such as using mobile equipment to sweep for contraband mobile communications devices, or the like.

SUMMARY

The present invention is directed to systems and methods, which provide for identification of a controlled-environment facility resident in possession of a contraband communications device. Managed access data and/or contraband communications device assessment data for contraband communications devices operating in the controlled-environment facility is captured and controlled-environment facility resident communications system call data for each resident of the controlled-environment facility is gathered. Correlations in the managed access data and/or assessment data with the controlled-environment facility resident communications system call data are identified, thereby identifying each resident of the controlled-environment facility in possession of a contraband communications device.

Hence, a system for identifying a controlled-environment facility resident in possession of a contraband communications device may employ a managed access system and/or a contraband communications device assessment system adapted to capture managed access data and/or contraband communications device assessment data for contraband communications devices operating in the controlled-environment facility. A controlled-environment facility resident communications system may be adapted to gather controlled-environment facility resident communications system call data for each resident of the controlled-environment facility. Further, one or more computer systems (such as the controlled-environment facility resident communications system, or the like) may be adapted to accept the managed access data and/or contraband communications device assessment data, gather the controlled-environment facility resident call data for each resident from the controlled-environment facility resident communications system, and identify correlations in the managed access data and/or assessment data with the controlled-environment facility resident communications system call data, thereby identifying each resident of the controlled-environment facility in possession of a contraband communications device.

The captured managed access data and/or contraband communications device assessment data may include telephone numbers called or messaged by the contraband communications devices operating in the controlled-environment facility. Likewise, the gathered controlled-environment facility resident communications system call data may include telephone numbers called or messaged by each resident, via the controlled-environment facility resident communications system.

Identifying correlations in the managed access data and/or assessment data with the controlled-environment facility resident communications system call data may not only identify a single resident possessing a contraband communications device. Correlations between the controlled-environment facility resident communications system call data of a plurality of residents and the managed access data and/or assessment data of a single contraband communications device operating in the controlled-environment facility may also be identified. This may identify each of a plurality of residents of the controlled-environment facility using the single contraband communications device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
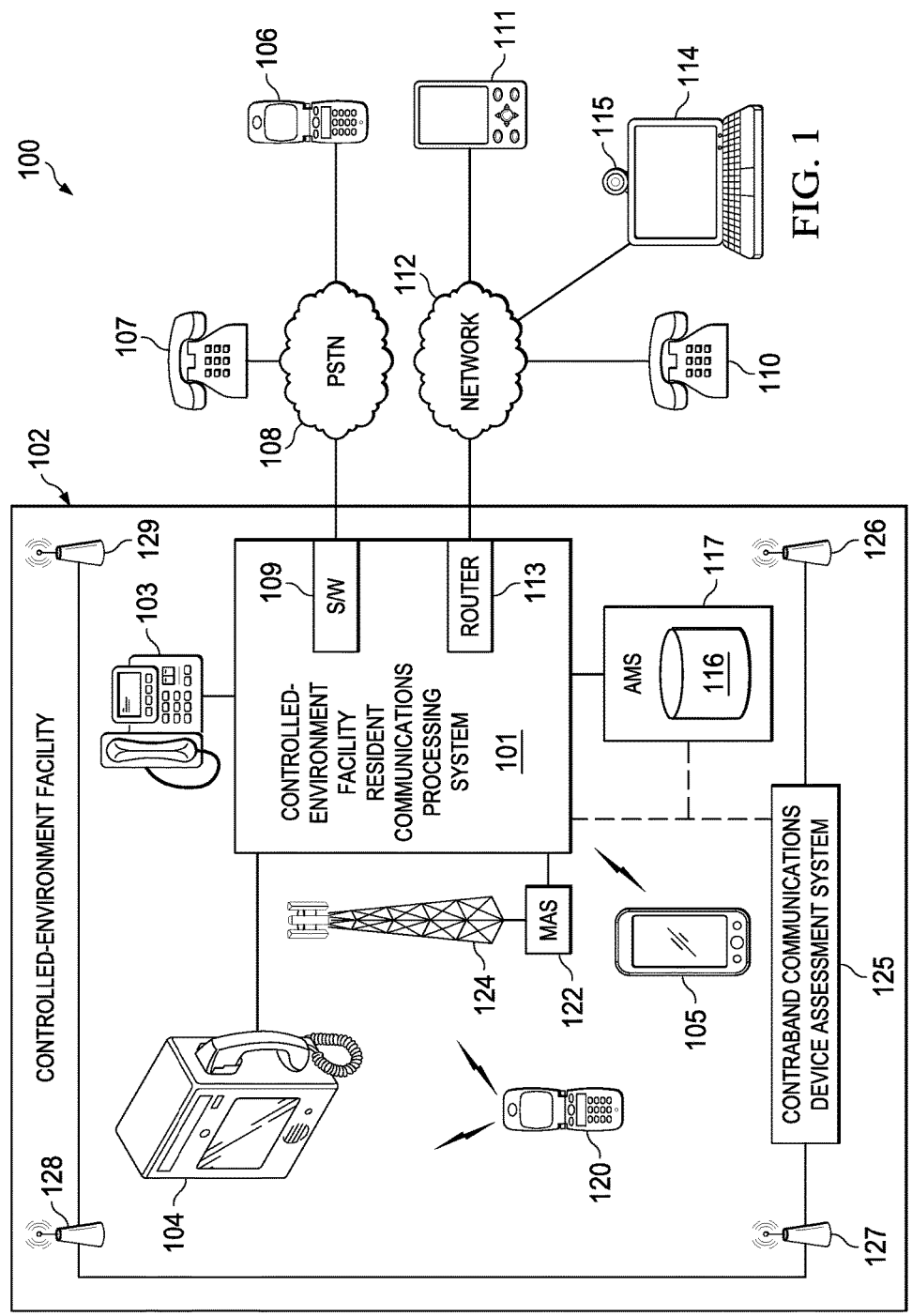
Figure 2:
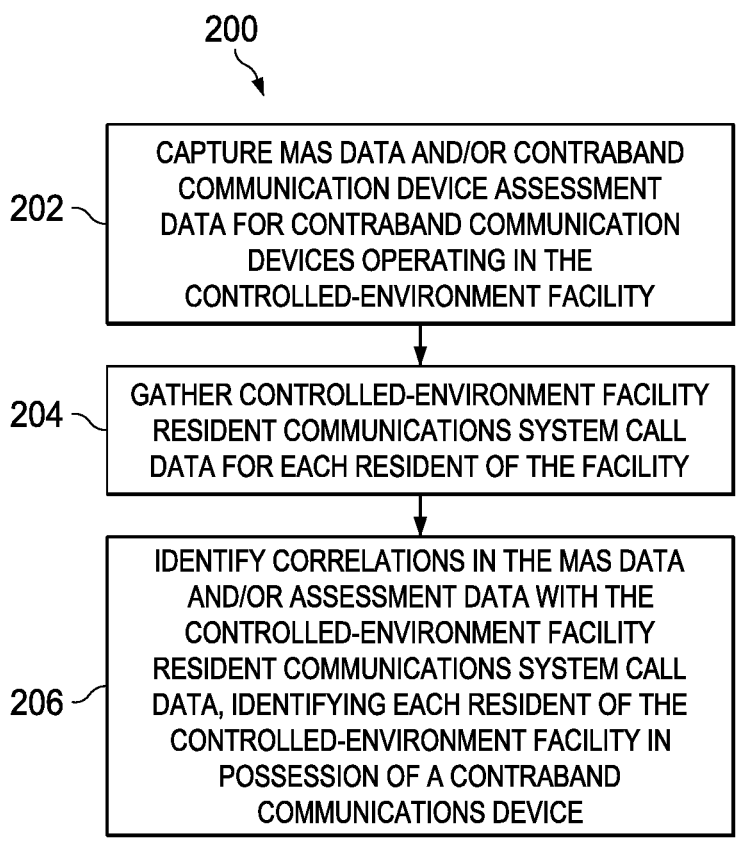
Figure 3:
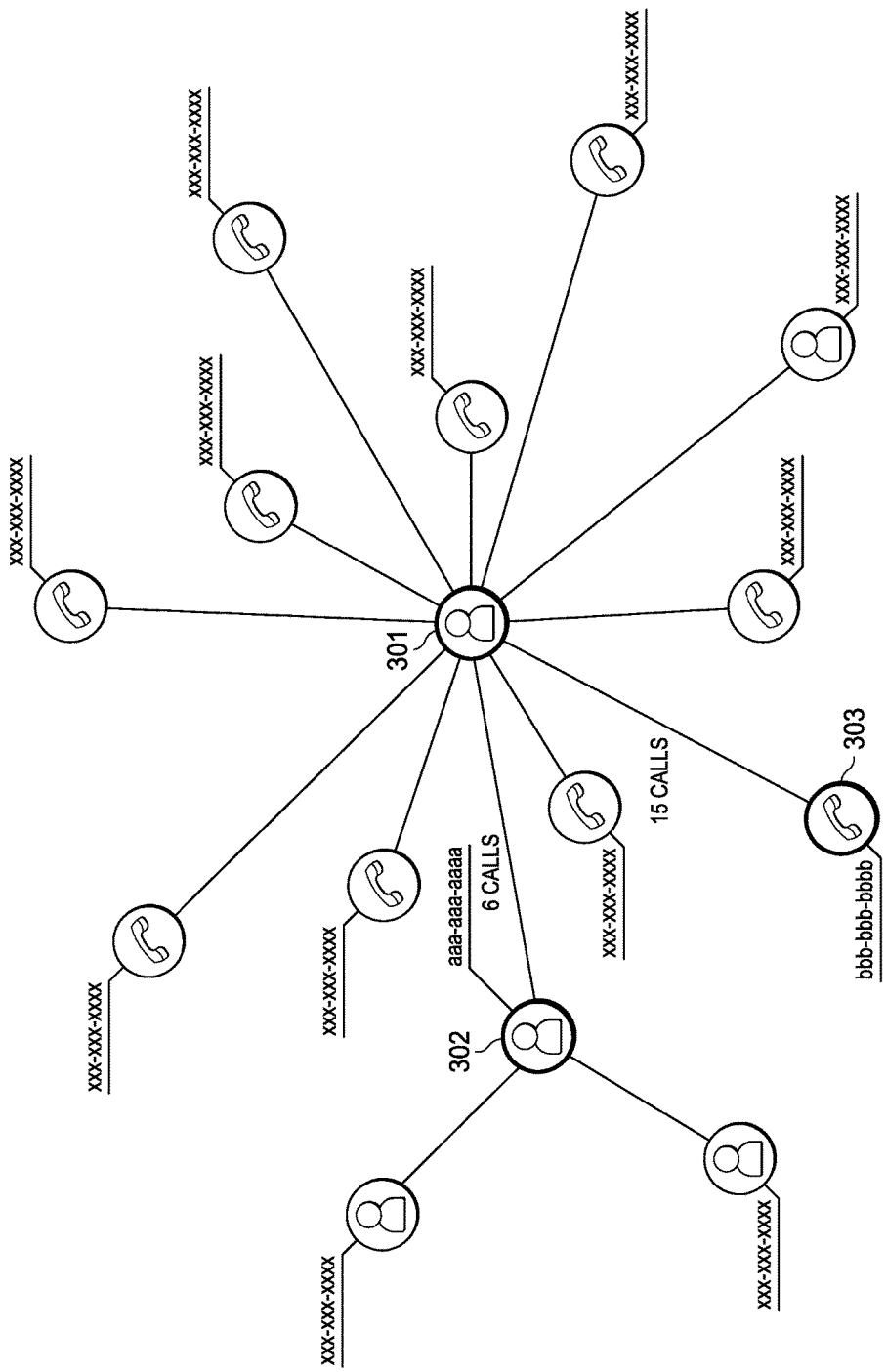
Figure 4:
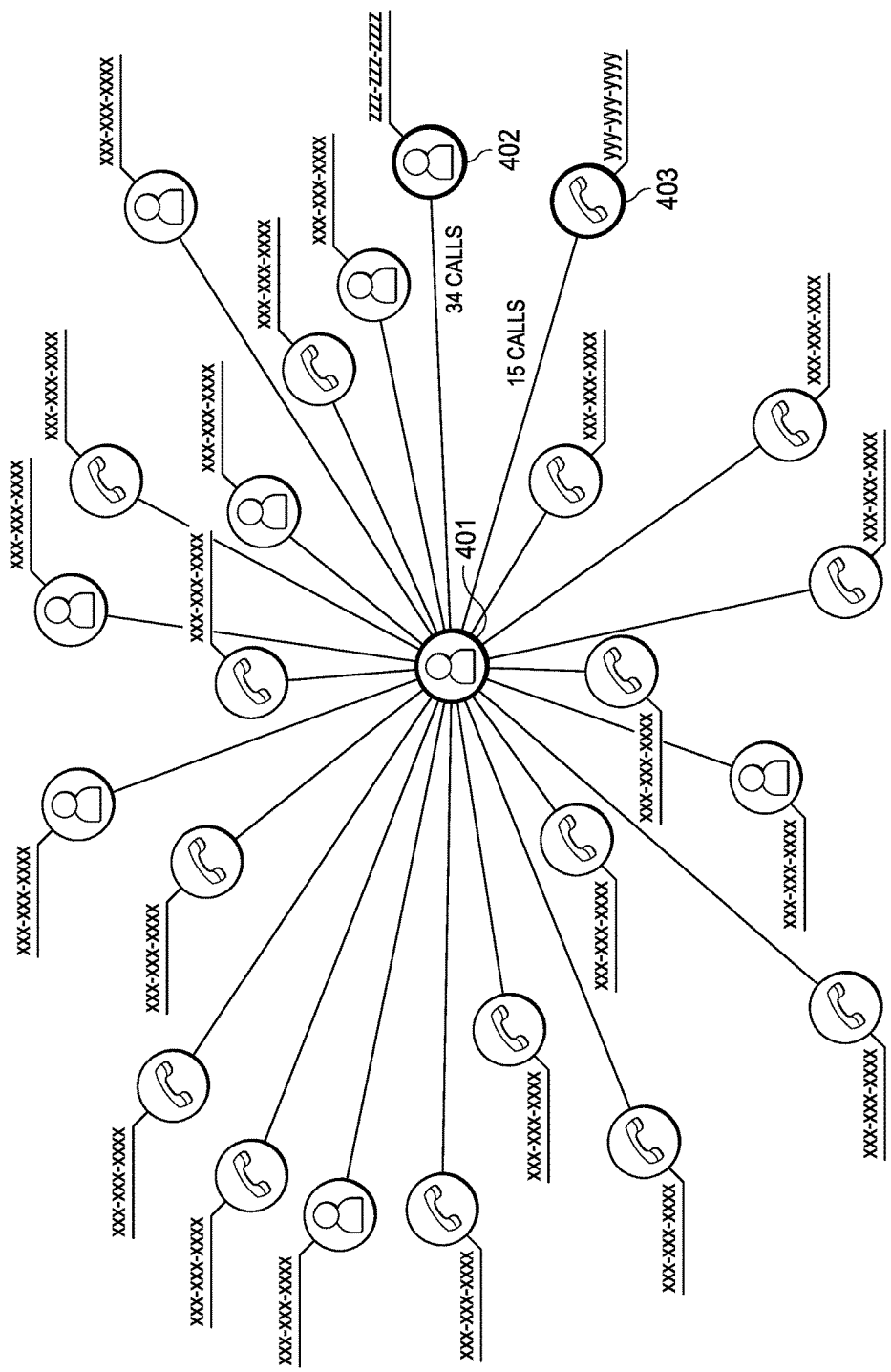
Figure 5:
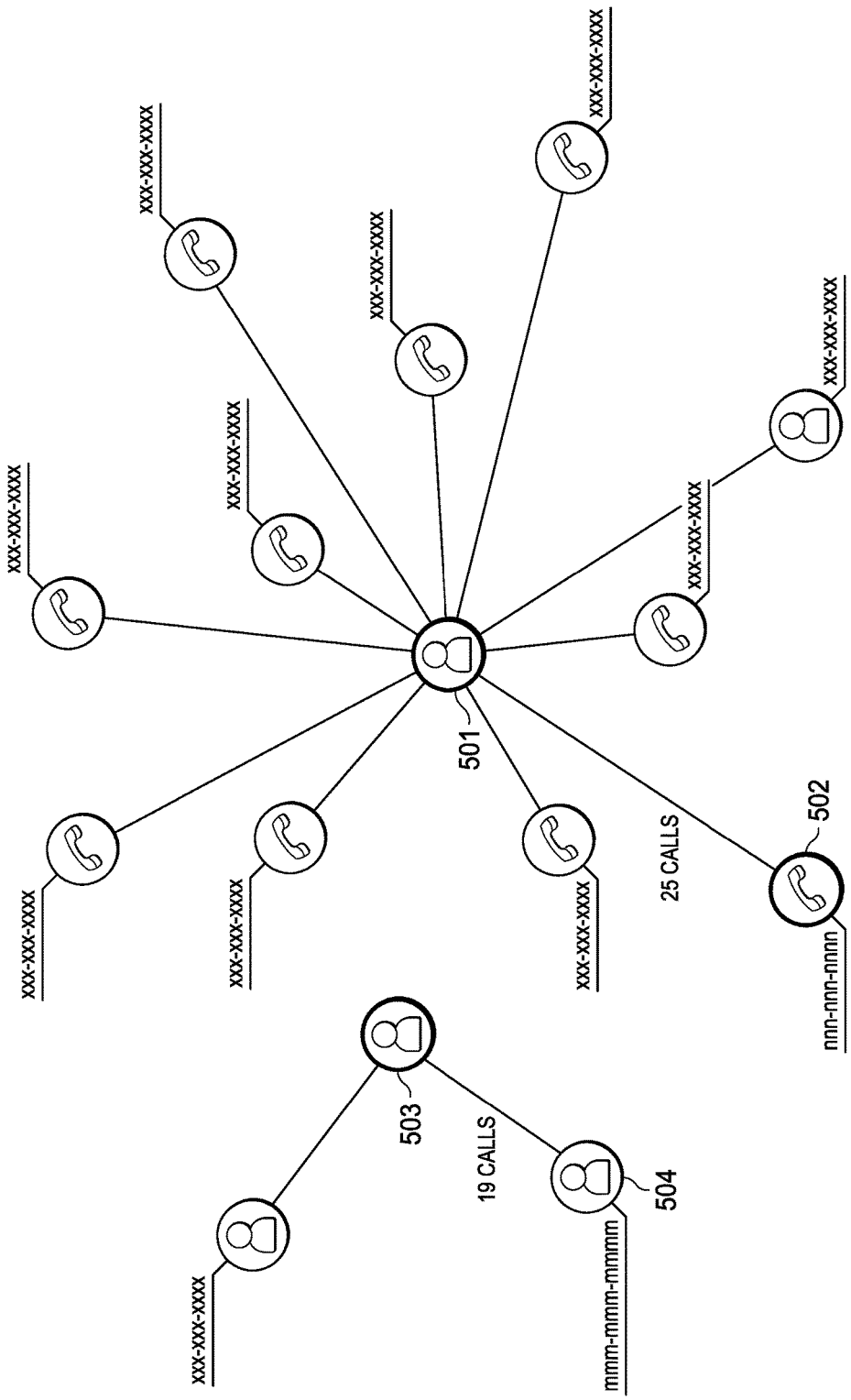
Figure 6:
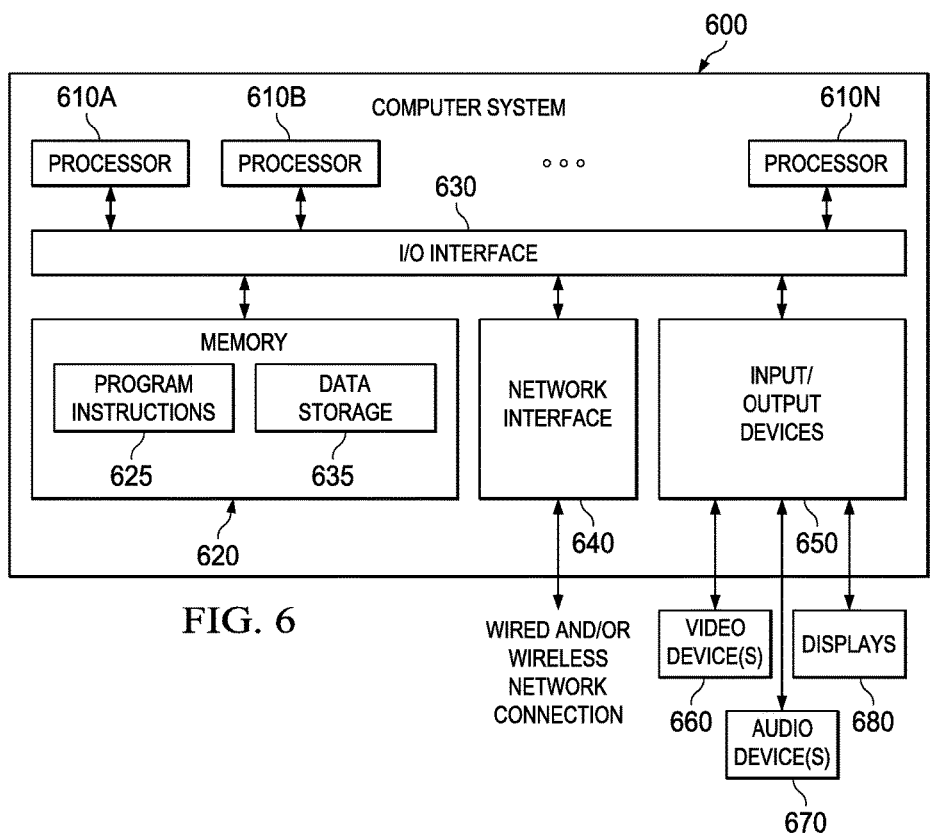

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for Contraband Wireless communications device Identification in controlled-environment facilities may be employed, according to some embodiments;

FIG. 2 is a flowchart of an example process for contraband wireless communications device identification in controlled-environment facilities, in accordance with some embodiments;

FIG. 3 is a sociogram of an example implementation of the present systems and methods for identification of a controlled-environment facility resident in possession of a contraband communications device, in accordance with some embodiments;

FIG. 4 is a sociogram of another example implementation of the present systems and methods for identification of a controlled-environment facility resident in possession of a contraband communications device, in accordance with some embodiments;

FIG. 5 is a sociogram of another example implementation of the present systems and methods showing identification of two controlled-environment facility residents in possession of a contraband communications device, in accordance with some embodiments; and FIG. 6 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present disclosure relates generally to controlled-environment facilities, more specifically to communications by residents of controlled-environment facilities, and particularly to identification of the possessors of contraband wireless communications devices in controlled-environment facilities, such as analysis of controlled-environment facility resident communications system data in conjunction with Managed Access System (MAS) data and/or communications device assessment data. In accordance with embodiments of the present systems and methods for identification of a controlled-environment facility resident in possession of a contraband communications device, managed access data and/or contraband communications device assessment data for contraband communications devices operating in the controlled-environment facility is captured or otherwise accepted. Controlled-environment facility resident call data for each resident of the controlled-environment facility is gathered from the controlled-environment facility resident communications system. Thereafter, correlations in the managed access data and/or assessment data with the controlled-environment facility resident communications system call data are identified to identify each resident of the controlled-environment facility in possession of a contraband communications device.

Embodiments of the present systems and methods facilitate identification of which controlled environment facility residents are in possession of contraband wireless communications devices through non-physical means. While existing systems and methods may alert controlled-environment facility personnel that they have a contraband communications device problem, these existing systems and methods do not typically afford much usable intelligence as to who has the contraband communications device. As noted, existing hardware devices (e.g. "wands") can detect a cell phone or the like, while it is turned on, when a user of the hardware is close to the communications device. However residents, particularly savvy residents such as correctional facility inmates, know this and turn their contraband phones off when not in use (as well as to conserve battery in an environment where it is difficult to gain access to charging).

Embodiments of the present systems and methods use MAS data and/or communications device assessment data, such as International Mobile Station Equipment Identity (IMEI) for Global System for Mobile Communications (GSM) devices or Mobile Equipment Identifier (MEID) (which may include Equipment Serial Numbers (ESNs) for older devices) in Code Division Multiple Access (CDMA) devices, phone numbers dialed or texted, and/or the like. This MAS and/or or communications device assessment data is compared to controlled-environment facility resident communications system data (which may be referred to as Resident Telephone System (RTS) data or Inmate Telephone System (ITS) data, in a correctional environment) to obtain patterns and/or correlations between the two data sets. Probabilities are assigned as to which residents/inmates more than likely have the contraband communications device, based on several parameters.

A communications device assessment, which may be a temporary analysis, or the like (e.g. an audit) may use temporarily installed, or mobile, equipment and can provide IMEI/MEID data, where in the facility the communications device was used, location of the called party, call data (such the number called, duration, etc.), and other metadata.

A MAS may be a permanent system installed in or in conjunction with the subject controlled-environment facility. MAS hardware employs antennas and the like, to continuously monitor communications devices operating in the controlled-environment facility, collecting communications device data, such as IMEI/MEIDs, numbers dialed or texted-to, and/or the like. A MAS may act as a cell site at/for the controlled-environment facility, in some embodiments.

A controlled-environment facility resident communications system has all the call data (e.g. Call Detail Records (CDRs)) for the residents/inmates, (i.e. meta data for legitimate resident/inmate communications carried out using controlled-environment facility communications systems).

Embodiments of the present systems and methods, gather call records from contraband communications device call intercepts (such as by MAS and/or an assessment), gather controlled-environment facility resident communications system data, and cross-correlates those two data sets (i.e. the CDRs from the controlled-environment facility resident communications system with IMEI/MEIDs, called numbers, and/or the like, from the MAS and/or an assessment). Such cross-correlation may not only provide identification of the contraband communications device, but also identify the resident that used the device in a particular communication. Data used from the data sets may also include data derived from the data sets, such as frequency of calls, or the like.

Other indicators may help confirm correlation of the two sets of data, such as an indication that a suspected contraband communications device holder has ceased, or at least greatly reduced use of the controlled-environment facility resident communications system, such as may be gleaned from controlled-environment facility resident communications system (frequency of use) data, particularly if such reduction in use of the controlled-environment facility resident communications system corresponds to appearance of the contraband communications device the resident is suspected having.

Thus, embodiments of the present systems and methods, take captured contraband communications device (e.g. cell phone) dialed or texted-to numbers, through MAS or assessment data, and compare them against controlled-environment facility resident communications system data through forensic and other communication analysis tools that analyze communications into and out of controlled-environment facilities to identify high probability residents/inmates who are using contraband communications devices in an automated manner. Hence, embodiments of the present systems and methods correlate resident/inmate to communications device, such as based on calling patterns to provide nonintrusive detection of the party in possession of a contraband communications device.

FIG. 1 is a diagrammatic illustration of example communications environment 100, wherein an example embodiment of the present systems and methods for contraband wireless communications device identification in controlled-environment facilities may be employed, according to some embodiments. As shown, controlled-environment facility resident communications processing system 101 may provide telephone services, videoconferencing, online chat, and other communication services to controlled-environment facility 102. For example, in some cases, communication system 101 may be co-located with a controlled-environment facility (102), such as illustrated in FIG. 1. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

For instance, residents may access such services using telephones 103 to access certain communication services. In some facilities, residents may use video visitation device(s) 104, which may be referred to as an Intelligent Facility Devices (IFDs), personal computer wireless device 105 adapted or approved for use in controlled-environment facility 102, or the like. For example, a resident may initiate telephone services by lifting the receiver on telephone 103 or IFD 104, or by launching a communication application program on device 105, at which time the resident may be prompted to provide a personal identification number (PIN), other identifying information or biometrics. An interactive voice response (IVR) unit (not shown) may generate and play prompt or other messages to residents on devices 103, 104 and/or 105.

Under the control of communication processing system 101, devices 103, 104 and 105 may be capable of connecting to a non-resident's (i.e., a person not committed to a controlled-environment facility) device 106 or telephone 107 across a publicly switched telephone network (PSTN) 108. For example, device 106 may be a mobile phone, whereas telephone 107 may be located at a non-resident's home or office, an inmate visitation center, etc. Switch 109 in communication processing system 101 may be used to connect calls across PSTN 108. Additionally or alternatively, the non-resident may be at telephone 110 or device 111, which is on an Integrated Services Digital Network (ISDN), Voice-over-IP (VoIP), or packet data network 112, such as, for example the Internet. Router 113 of communication system 101 is used to route data packets associated with a call connection to destination telephone 110 or device 111.

Video visitation device(s) (IFDs) 104 may have video conferencing capabilities to enable residents to participate in video visitation sessions with non-residents of the correctional facility via video call, secure online chat, etc. For example, a non-resident party may have a personal or laptop computer 114 with camera 115. Additionally or alternatively, device 114 may have an integrated camera and display (e.g., a smart phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use video-conferencing equipment compatible with ITU H.323, H.320, H.264, and/or V.80, or other suitable standards. Generally speaking, each video visitation device 104 may be disposed in a visitation room, in a pod, cell, etc. in controlled-environment facility 102.

In some embodiments, video visitation devices 104 may be implemented as a computer-based system. For example, each of video visitation devices 104 may include a display, camera, and handset. The display may be any suitable electronic display such as, for example, a Liquid Crystal Display (LCD), a touchscreen display (e.g., resistive, capacitive, etc.), or the like, whereas the camera may be an suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, video visitation devices 104 may be configured to capture a video image of a resident to be transmitted to a non-resident using the camera, and to display a video image of the non-resident to the resident using the display. Video visitation devices 104 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, video visitation devices 104 may assume the form of any computer, tablet computer, smart phone, etc., or any other consumer device or appliance with videoconferencing capabilities, such as a wall-mounted tablet computer devices in a hardened case.

In addition to providing certain visitation and communication operations, communication processing system 101 may attempt to ensure that an resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 116 maintained by Administration and Management System (AMS) 117. In addition to PAC list(s), AMS 117 may also store inmate or resident profile data (RPD), as well as visitation rules applicable to each resident. As an example, in the context of a correctional facility, database 116 may include information such as balances for inmate trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents.

In some implementations, communication system 101 may be configured to perform communications monitoring operations configured to monitor and or record telephone and/or video visitations (e.g., as electronic files). In scenarios where communication system 101 is located within the controlled-environment facility, it may have direct access to AMS 117. In other embodiments, however, communication system 101 may be located remotely with respect to the controlled-environment facility, and access to AMS 117 may be obtained via a computer network such as, for example, network 112.

In many controlled-environment facilities, residents are restricted from communicating with persons outside of the controlled-environment facility using any device other than the system described above (103, 104 or 105). Reasons for this include protection of persons outside of the controlled-environment facility from offensive, inappropriate, or illegal contact with a resident. Additionally, these restrictions may help to prevent residents from directing further illegal activity with conspirators located outside of the controlled-environment facility, witness tampering, victim protection etc. Administrators of the controlled-environment facility may wish to limit the residents' contact to parties on the resident's PAC list. Nonetheless, residents often find ways of bypassing the approved communication system. For example, contraband communications devices 120 are often smuggled into controlled-environment facilities.

Managed Access System 122 may be employed in some controlled-environment facility to intercept and manage communications attempted by contraband communications devices (120). Such an MAS may employ a cellular data access point 124 (i.e. a cellular antenna). For example, a dedicated cellular data access point 124 may be placed within (e.g. in or near a center of the controlled-environment facility, as illustrated in FIG. 1), or at least near enough to the controlled-environment facility, such that all wireless communications devices within the facility, including contraband communications devices, identify the cellular data access point 124 as the primary base station for the communications cell. In certain embodiments, the power levels associated with the cellular data access point 124 may be adjusted such that the geographical area of the communications cell corresponds with the area of the controlled-environment facility 102. Thus, all cellular communications originating from within the controlled-environment facility 102 may be directed through MAS 122 or another embodiment of a communications interception device, such as communications processing system 101. MAS 122 may control communication from and to contraband communications devices 120 without impacting legitimate wireless communications (such as by controlled-environment facility staff wireless communications devices, approved communications devices 105, or the like) or within designated areas of controlled-environment facility 102. Such a MAS may be a combination of a specially managed cellular telephone system network and a tightly controlled distributed antenna system, central antenna 124, or the like. MAS 122 may employ 2G, 3G, 4G and 5G technologies and protocols used by wireless cellphone carriers. MAS 122 may apply policy rules determined by facility administrators, which may be administered by AMS 117, such as via communications processing system 101. In accordance with embodiments of the present systems and methods, MAS 122 may capture contraband communications data such as contraband communications device IMEI or MEID, phone numbers dialed or messaged, and/or the like.

Contraband communications devices assessment system 125 may perform an assessment (audit) of contraband communications device usage in a controlled-environment facility (102). Contraband communications devices assessment system 125 may be temporally deployed within or in conjunction with controlled-environment facility 102 and may employ temporary antennas 126 through 129, or the like, deployed throughout the facility to monitor contraband communications device activity. As with MAS 122 contraband communications devices assessment system 125 may capture contraband communications device IMEIs, MEIDs, phone numbers dialed or messaged, and/or the like.

Embodiments of the present systems and methods are facilitated by collecting as much data as possible about the contraband communications device, such as through MAS 122 or assessment by system 125, and through provisioning of complete call records, such as CDRs, by controlled-environment facility resident communications system 101.

FIG. 2 is a flowchart of example process 200 for contraband wireless communications device identification in controlled-environment facilities, in accordance with some embodiments. Therein, example implementation 200 for identification of a controlled-environment facility resident in possession of a contraband communications device includes capturing managed access data and/or contraband communications device assessment data for contraband communications devices operating in the controlled-environment facility at 202. This captured managed access data and/or contraband communications device assessment data may comprise telephone numbers called or messaged by the contraband communications devices operating in the controlled-environment facility, or the like. At 204, controlled-environment facility resident communications system call data is gathered for each resident of the controlled-environment facility. This gathered controlled-environment facility resident communications system call data may comprise telephone numbers called or messaged by each resident, via the controlled-environment facility resident communications system.

At 206 correlations in the managed access data and/or assessment data with the controlled-environment facility resident communications system call data are identified, to thereby identify each resident of, or other party in, the controlled-environment facility in possession of a contraband communications device.

Hence, in certain embodiments of the present systems and methods, the managed access data and/or contraband communications device assessment data for the contraband communications devices operating in the controlled-environment facility captured at 202 comprises telephone numbers called or messaged by the contraband communications devices operating in the controlled-environment facility. Correspondingly, in such certain embodiments, controlled-environment facility resident communications system call data gathered at 204 comprises telephone numbers called or messaged by each resident, via the controlled-environment facility resident communications system. Therein, identification of correlations in the data at 206 comprises identifying one or more residents who called or messaged a same number via the controlled-environment facility resident communications system that appears in the managed access data and/or contraband communications device assessment data for contraband communications devices operating in the controlled-environment facility. Thereby, each resident of the controlled-environment facility in possession of a contraband communications device may be identified at 206.

In some instances, identifying correlations in the managed access data and/or assessment data with the controlled-environment facility resident communications system call data at 206 might include identifying correlations between the controlled-environment facility resident communications system call data gathered at 204 of a plurality of residents and the managed access data and/or assessment data captured at 202 of a single contraband communications device operating in the controlled-environment facility. Thereby, each of a number of residents of the controlled-environment facility sharing a single contraband communications device may be identified at 206. In such situations, the use of a contraband communications device may be confirmed to a high probability through correlation of the IMEI/MEID of the subject contraband communications device. For example, an IMEI/MEID analysis may be run at 206. Therein, one number called from one IMEI and another number called from the same IMEI would establish that the same contraband communications device was used in the calls. Such a "shared" device may also be an indication that a controlled-environment facility staff member is providing the contraband communications device. In such, or other embodiments, another correlation that may be examined may be an International Mobile Subscriber Identity (IMSI). Examination of the IMSI from calls by contraband communications devices, particularly taken in conjunction with IMEI/MEID data may indicate whether individual residents are (each) using their own Subscriber Identity Module (SIM) card with one or more shared contraband communications devices.

In accordance with embodiments of the present systems and methods, employing example implementation 200 in example environment 100 to identify (a) controlled-environment facility resident(s) in possession of contraband communications device(s) 120, MAS 122, contraband communications device assessment system 125, and/or the like is adapted to capture managed access data and/or contraband communications device assessment data for contraband communications devices 120 operating in controlled-environment facility 102, at 202. Controlled-environment facility resident communications processing system 101 (such as, in some embodiments, in conjunction with AMS 117) is adapted to gather controlled-environment facility resident communications system call data for each resident of controlled-environment facility 102, at 204. One or more computer systems, which may include controlled-environment facility resident communications system 101, AMS 117, and/or the like are adapted to accept the managed access data and/or contraband communications device assessment data and gather the controlled-environment facility resident call data for each resident from the controlled-environment facility resident communications system. Whereupon, these one or more computer systems identify correlations in the managed access data and/or assessment data with the controlled-environment facility resident communications system call data at 206 to identify each resident of the controlled-environment facility, or other party in the facility, in possession of a contraband communications device (120).

Various steps may be employed to establish a high-probability that a particular resident has a contraband communications device (120). For example, identifying correlations in the managed access data and/or assessment data with the controlled-environment facility resident communications system call data, such as at 206, may further include determining a threshold volume of calls to one or more telephone numbers called or messaged by a contraband communications devices operating in the controlled-environment facility. This may establish a higher probability that a particular resident, who had called the one or more numbers, via the controlled-environment facility resident communications system, is in possession of a contraband communications device. For example, in accordance with such embodiments, a higher number of calls on the controlled-environment facility resident communications system call data side and/or on the managed access data and/or assessment data side would, either and/or together, be an indication of a higher probability that an identified resident was in possession of an identified contraband communications device.

As another example, identification of correlations in the managed access data and/or assessment data with the controlled-environment facility resident communications system call data at 206 may further include determining multiple phone numbers called or messaged by a contraband communications device that correlate with a single resident of the controlled-environment facility. In still another example, correlations identified at 206 in the managed access data and/or assessment data with the controlled-environment facility resident communications system call data may further include determining a number of residents who have called or messaged numbers. In such embodiments, a lower number of other residents calling a captured number appearing in the suspect resident's resident communications system data may indicate a higher probability the resident is in possession of the subject contraband communications device.

In other examples for establishing a high-probability that a particular resident has a contraband communications device (120), information other than, or in addition to, numbers dialed and/or messaged may be used. For example, identifying correlations in the managed access data and/or assessment data with the controlled-environment facility resident communications system call data at 206 may further or alternatively include detecting when a resident has ceased to use or has greatly reduced use of the controlled-environment facility resident communications system (101) to place calls. This may be viewed as raising the probability that the suspect resident has access to a contraband communications device (120).

As a another example, identifying each party in the controlled-environment facility in possession of a contraband communications device at 206 further comprises correlating information such as maintained in database 116 of AMS 117 as to a housing unit that a resident is located in with contraband communications device location data from the managed access data and/or assessment data. Further in such regard, Global Positioning System (GPS) data from the contraband device may be captured by the managed access system 122 and/or assessment system 125. Such GPS data points can further confirm the party having a contraband device, the more such data points available, the more solidly the possessor is established. For example, the GPS data may be used to determine a resident housing unit, other facility location, a facility staff member (e.g. corrections officer) assigned location, and/or the like, corresponding to a contraband device, to further verify who has the contraband device. In such an example, not only may one or more residents be sharing a device, but a staff member associated with the location (e.g. a corrections officer in an identified cellblock or pod) may be indicated as providing the contraband communications device.

In some examples, captured Billed Number Address (BNA), called or messaged by contraband communications devices may be correlated with resident data from the controlled-environment facility resident communications system to identifying each resident of the controlled-environment facility in possession of a contraband communications device. Also such BNA data and/or captured Location Based Service (LBS) location data of the called number may be correlated in relationship to corrections officers' addresses, resident relative's addresses, and/or the like to further verify the possessor of a contraband communications device, in accordance with some embodiments.

In another example, timing of identified correlated communications may be observed to determine if a contraband communications device used for the correlated communications is being used by more than one resident, at different times, and/or at times during contact with a facility staff member. Use of social media, such as by called parties, may be used to confirm correlations as well. For example, social media use by a friend or family member of a suspected possessor or user of a contraband communications device may be monitored to look for such correlations, such as posts about the suspected possessor soon after a suspected contraband communication, geo-tag data of posted images (of residents), or the like.

As yet another example, call volume after a last identified correlated communication by a contraband communications device used for the correlated communication may be observed to determine the likelihood of the resident that last had possession of the contraband communications device. In some example embodiments, identification of correlations may further or alternatively include correlating captured keywords from messages sent by contraband communications devices with resident data from the controlled-environment facility resident communications system data (such as data maintained on database 116, by AMS 117) to identifying each resident of the controlled-environment facility in possession of a contraband communications device. In such embodiments as described above, and/or in further embodiments emoticons, other special characters relatively unique alphanumeric combinations, and/or combinations thereof, in text messages may be tracked to identify, or help confirm the identity, of the possessor of contraband communications device. Further, emoticons, other special characters, relatively unique alphanumeric combinations, and/or combinations thereof, may be analyzed to detect their use as code, or the like.

Further, with respect to text messages, a "fake" text message reply may be sent to a text message from a contraband device, spoofing a phone number or other identifier of a party texted using the contraband device. Also, a "silent" text may be sent to a contraband communications device as a "ping," such as to confirm the contraband device is turned on, in a particular location (e.g. using GPS data such as discussed above) and/or the like.

FIGS. 3, 4 and 5 are sociograms of example implementations of the present systems and methods for identification of a controlled-environment facility resident in possession of a contraband communications device, in accordance with some embodiments. In the examples of FIGS. 3, 4 and 5, a communications device (e.g. cell phone) assessment was completed for an example controlled-environment facility. For purposes of the illustrated examples, the example assessment produced a number of unique dialed numbers (dialed for voice calls or to send Short Message Service (SMS) (i.e. text) messages to the dialed number. Numbers that are indicated as "xxx-xxx-xxxx" are various numbers gathered from a controlled-environment facility resident communications system that are not discussed below.

Using this data, controlled-environment facility resident communications system data for the facility, and the analytics of the present systems and methods, the goal is to identify, to a high probability, users of contraband communications devices that were detected during the assessment. In such an implementation, a "bounce list" of the unique dialed phone numbers may be generated and compared to controlled-environment facility resident communications system data for the facility to provide a list of phone numbers in common between the assessment and the controlled-environment facility resident communications system. For purposes of the illustrated examples, a number of the unique dialed phone numbers are found to have been contacted by residents of the controlled-environment facility, via the controlled-environment facility resident communications system and of this number, some of the contacted phone numbers were found to have been contacted by one resident multiple times, via the controlled-environment facility resident communications system.

With attention directed to FIG. 3 resident 301 is shown by controlled-environment facility resident communications system data as calling non-resident 302 at assessment-captured telephone number aaa-aaa-aaaa six times and also calling assessment-capture telephone number bbb-bbb-bbbb fifteen times. In this example, no other resident is recorded by the controlled-environment facility resident communications system as calling bbb-bbb-bbbb. Hence, resident 301 is identified as having possession of a contraband communications device for which the assessment data was captured, that is, the contraband communications device that called aaa-aaa-aaaa and bbb-bbb-bbbb, to a high probability.

With attention directed to FIG. 4 resident 401 is shown by controlled-environment facility resident communications system data as calling non-resident 402 at assessment-captured telephone number zzz-zzz-zzzz thirty-four times and also calling assessment-capture telephone number yyy-yyy-yyyy (403) fifteen times. In this example, no other resident is recorded by the controlled-environment facility resident communications system as calling either zzz-zzz-zzzz or yyy-yyy-yyyy. Thus, resident 401 is identified as having possession of a contraband communications device for which the assessment data was captured, the contraband communications device that called zzz-zzz-zzzz and yyyyyy-yyyy, to an even higher probability, since no other resident called either zzz-zzz-zzzz or yyy-yyy-yyyy.

With attention directed FIG. 5, resident 501 is shown by controlled-environment facility resident communications system data as calling non-resident 502 at assessment-captured telephone number nnn-nnn-nnnn twenty-five times, via the controlled-environment facility resident communications system. In the same assessment, resident 503 is shown by controlled-environment facility resident communications system data as calling non-resident 504 at assessment-captured telephone number mmm-mmm-mmmm nineteen times, via the controlled-environment facility resident communications system. However, for purposes of this example, the same contraband communications device (such as identified by IMEI or MEID) is shown in the assessment data as calling each of these two numbers. Thus, in this example, residents 501 and 503 are identified as sharing a contraband communications device for which the assessment data was captured, the contraband communications device that called nnn-nnn-nnnn and mmm-mmm-mmmm.

In the example illustrated in FIG. 5, two residents sharing a contraband communications device may be identified by the call data associated with a single IMEI/MEID being correlated to controlled-environment facility resident communications system data (e.g. CDR data) for each of these residents. Such identification of two (or more) residents sharing a contraband communications device can be further substantiated if the residents have a location within the facility in common, particularly at a particular time. Using the example of FIG. 5, if resident 501 shares a sleeping area (dorm, cell, pod, etc.) with resident 503, then an indication in accordance with embodiments of the present systems and methods that they share a contraband communications device is more likely valid. Further, such sharing of a device may call into question whether a facility staff member is providing access to the contraband communications device. Additional correlation of call data with staff member work schedules, locations at particular times, and the like may facilitate identifying such a staff member and/or facilitate elimination of participation of one or more staff members in providing access to the contraband communications device.

Embodiments of the present systems and methods for contraband wireless communications device identification in controlled-environment facilities, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, media player, or the like. For example, in some cases, computer 600 may implement one or more steps of example process 200 described above with respect to FIGS. 2 through 5, and/or a computer system such as computer system 600 may be used as, or as part of, one or more of controlled-environment facility resident communications system 101, controlled environment facility management system 117, MAS 122, Contraband communications devices assessment system 125, and/or the like. In various embodiments two or more of these computer systems may be configured to communicate with each other in any suitable way, such as, for example, via a network, such as via local area network, and/or wireless functionality.

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for identification of a controlled-environment facility resident-shared contraband wireless communications device, the method comprising:
   capturing wireless managed access data and/or contraband wireless communications device assessment data for contraband wireless communications devices operating in a controlled-environment facility, by at least one of a wireless managed access system and a contraband wireless communications device assessment system;
   gathering, by a controlled-environment facility resident communications system, controlled-environment facility resident communications system call data for each resident of the controlled-environment facility; and
   identifying correlations between one equipment identity or identifier in the wireless managed access data and/or contraband wireless communications device assessment data with two or more called and/or messaged telephone numbers from the controlled-environment facility resident communications system call data, thereby identifying one contraband communications device operating in the controlled-environment facility as a shared contraband wireless communications device.

2. The method of claim 1, further comprising
   identifying correlations in the data by identifying one or more residents who called or text messaged a same number via the controlled-environment facility resident communications system that appears in the wireless managed access data and/or contraband wireless communications device assessment data for contraband wireless communications devices operating in the controlled-environment facility to identify each resident of the controlled-environment facility using the shared contraband wireless communications device.

3. The method of claim 1 further comprising identifying correlations in the wireless managed access data and/or contraband wireless communications device assessment data with the controlled-environment facility resident communications system call data by identifying correlations between the controlled-environment facility resident communications system call data of a plurality of residents and the managed access data and/or contraband wireless communications device assessment data of a shared contraband wireless communications device operating in the controlled-environment facility, thereby identifying each of a plurality of residents of the controlled-environment facility using the shared contraband wireless communications device.

4. The method of claim 1, further comprising identifying correlations in the wireless managed access data and/or contraband wireless communications device assessment data with the controlled-environment facility resident communications system call data by determining a threshold volume of calls to one or more telephone numbers called or text messaged by contraband wireless communications devices operating in the controlled-environment facility to establish a high probability that a particular resident of the controlled-environment facility who had called the one or more numbers via the controlled-environment facility resident communications system has used the shared contraband wireless communications device.

5. The method of claim 1, further comprising identifying correlations in the wireless managed access data and/or contraband wireless communications device assessment data with the controlled-environment facility resident communications system call data by determining multiple phone numbers called or text messaged by the shared contraband wireless communications device correlate with a single resident of the controlled-environment facility.

6. The method of claim 1, wherein the one equipment identity or identifier comprises the device international mobile station equipment identity (IMEI) or mobile equipment identifier (MEID) of the shared contraband wireless communications device.

7. The method of claim 1 further comprising identifying a resident using the shared contraband wireless communications device by identifying correlations in the wireless managed access data and/or contraband wireless communications device assessment data with the controlled-environment facility resident communications system call data indicating when a resident has ceased to use or has greatly reduced use of the controlled-environment facility resident communications system to place calls.

8. The method of claim 1 further comprising identifying each resident of the controlled-environment facility using the shared contraband wireless communications device by correlating a housing unit a resident is located in with location data from the wireless managed access data and/or assessment data for the shared contraband wireless communications device.

9. The method of claim 1 wherein identifying correlations between one equipment identity or identifier in the managed access data and/or assessment data with two or more called and/or messaged telephone numbers from the controlled-environment facility resident communications system call data further comprises observing timing of identified correlated communications for determining if a contraband communications device used for the correlated communications is being used by more than one resident at different times to identify the contraband wireless communications device as being shared.

10. The method of claim 1 further comprising observing call volume after a last identified correlated communication by the shared contraband wireless communications device used for the correlated communication to determine a resident that last had possession of the shared contraband wireless communications device.

11. The method of claim 1, further comprising correlating captured keywords from messages sent by the shared contraband wireless communications device with resident data from the controlled-environment facility resident communications system call data to identify each resident of the controlled-environment facility using the shared contraband wireless communications device.

12. The method of claim 1, further comprising correlating captured billed number address called or messaged by the shared contraband wireless communications device with resident data from the controlled-environment facility resident communications system to identify each resident of the controlled-environment facility using the shared contraband wireless communications device.

13. The method of claim 1, further comprising identifying each resident of the controlled-environment facility using the shared contraband wireless communications device by correlating global positioning system data from the shared contraband wireless communications device in captured managed access data and/or contraband communications device assessment data with a location associated with a resident.

14. A system for identifying a controlled-environment facility resident shared contraband communications device, the system comprising:

at least one of a managed access system and a contraband wireless communications device assessment system configured to capture managed access data and/or contraband communications device assessment data for contraband wireless communications devices operating in the controlled-environment facility;

a controlled-environment facility resident communications system configured to gather controlled-environment facility resident communications system call data for each resident of the controlled-environment facility; and one or more computer systems configured to:
    accept the managed access data and/or contraband communications device assessment data;
    gather the controlled-environment facility resident call data for each resident from the controlled-environment facility resident communications system; and
    identify correlations between one equipment identity or identifier in the managed access data and/or assessment data with two or more called and/or messaged telephone numbers from the controlled-environment facility resident communications system call data, identifying one contraband communications device operating in the controlled-environment facility as a shared contraband wireless communications device.

15. A non-transitory computer-readable storage medium having program instructions stored thereon that, upon execution by one or more computer systems associated with a controlled-environment facility resident communications system, causes the one or more computer systems to:
    accept managed access data and/or contraband communications device assessment data for contraband wireless communications devices operating in the controlled-environment facility from at least one of a managed access system and a contraband wireless communications device assessment system;
    gather controlled-environment facility resident call data for each resident of the controlled-environment facility from the controlled-environment facility resident communications system; and
    identify correlations between one equipment identity or identifier in the managed access data and/or assessment data with two or more called and/or messaged telephone numbers from the controlled-environment facility resident communications system call data, to identify one contraband communications device operating in the controlled-environment facility as a shared contraband wireless communications device.

16. The system of claim 14, wherein the one or more computer systems is further configured to identify correlations in the wireless managed access data and/or contraband wireless communications device assessment data with the controlled-environment facility resident communications system call data to identify correlations between the controlled-environment facility resident communications system call data of a plurality of residents and the managed access data and/or contraband wireless communications device assessment data of a shared contraband wireless communications device operating in the controlled-environment facility to identify each of a plurality of residents of the controlled-environment facility using the shared contraband wireless communications device.

17. The system of claim 14, wherein the one or more computer systems is further configured to identify each resident of the controlled-environment facility using the shared contraband wireless communications device by correlating global positioning system data from the shared contraband wireless communications device in captured managed access data and/or contraband communications device assessment data with a location associated with a resident.

18. The system of claim 14, wherein the one or more computer systems is further configured to identify each resident of the controlled-environment facility using the shared contraband wireless communications device by correlating a housing unit a resident is located in with location data from the wireless managed access data and/or assessment data for the shared contraband wireless communications device.

19. The non-transitory computer-readable storage medium of claim 15, wherein execution of the program instructions stored thereon by one or more computer systems associated with a controlled-environment facility resident communications system further causes the one or more computer systems to identify correlations in the wireless managed access data and/or contraband wireless communications device assessment data with the controlled-environment facility resident communications system call data to identify correlations between the controlled-environment facility resident communications system call data of a plurality of residents and the managed access data and/or contraband wireless communications device assessment data of a shared contraband wireless communications device operating in the controlled-environment facility to identify each of a plurality of residents of the controlled-environment facility using the shared contraband wireless communications device.

20. The non-transitory computer-readable storage medium of claim 15, wherein execution of the program instructions stored thereon by one or more computer systems associated with a controlled-environment facility resident communications system further causes the one or more computer systems to identify each resident of the controlled-environment facility using the shared contraband wireless communications device by correlating global positioning system data from the shared contraband wireless communications device in captured managed access data and/or contraband communications device assessment data with a location associated with a resident.

21. The non-transitory computer-readable storage medium of claim 15, wherein execution of the program instructions stored thereon by one or more computer systems associated with a controlled-environment facility resident communications system further causes the one or more computer systems to identify each resident of the controlled-environment facility using the shared contraband wireless communications device by correlating a housing unit a resident is located in with location data from the wireless managed access data and/or assessment data for the shared contraband wireless communications device.

* * * * *